United States Patent
Nozawa (10) Patent No.: US 8,023,801 B2
(45) Date of Patent: Sep. 20, 2011

(54) VIDEO RECORDING/REPRODUCING APPARATUS AND VIDEO RECORDING/REPRODUCING METHOD

(75) Inventor: Shingo Nozawa, Sumida-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1192 days.

(21) Appl. No.: 11/693,545

(22) Filed: Mar. 29, 2007

(65) Prior Publication Data

US 2007/0286574 A1      Dec. 13, 2007

(30) Foreign Application Priority Data

Apr. 18, 2006   (JP) ................................ 2006-114801

(51) Int. Cl.
*H04N 5/76*           (2006.01)
(52) U.S. Cl. ....................................... 386/294; 386/295
(58) Field of Classification Search ................. 386/235, 386/236, 263, 278, 292, 294, 295, 341
See application file for complete search history.

(56) References Cited

U.S. PATENT DOCUMENTS

| 2002/0054754 A1* | 5/2002 | Kikuchi et al. ................. 386/83 |
| 2005/0010904 A1 | 1/2005 | Morioka |
| 2006/0152599 A1 | 7/2006 | Yokonuma et al. |

FOREIGN PATENT DOCUMENTS

| CN | 1625897 A | 6/2005 |
| JP | 2003-163867 A | 6/2003 |
| JP | 2004-213487 A | 7/2004 |
| JP | 2005-026777 A | 1/2005 |
| JP | 2005-142674 A | 6/2005 |
| JP | 2005-333577 A | 12/2005 |
| JP | 2005-353136 A | 12/2005 |

* cited by examiner

*Primary Examiner* — Robert Chevalier
(74) *Attorney, Agent, or Firm* — Canon USA Inc IP Division (57) ABSTRACT

A video recording/reproducing apparatus includes a first recording unit that records video information on a first recording medium, a second recording unit that records video information on a second recording medium, a remaining capacity detecting unit that detects a remaining capacity of the first recording medium, a recording controlling unit that controls transferring of the video information on the first recording medium to the second recording medium when the remaining capacity of the first recording medium is not greater than a first reference value ($\alpha$), and a reproducing unit that reproduces the video information from the second and first recording media when it is recorded on the second and first recording media, respectively, and that sequentially reproduces the video information on the second and first recording media when part of the video information is recorded on the second recording medium and the rest is recorded on the first one.

15 Claims, 7 Drawing Sheets

VIDEO RECORDING/REPRODUCING APPARATUS AND VIDEO RECORDING/REPRODUCING METHOD

BACKGROUND OF THE INVENTION

1. Field of the Invention

The present invention relates to a video recording/reproducing apparatus and a video recording/reproducing method allowing use of a plurality of recording media at the same time.

2. Description of the Related Art

Recently, with progress of digital signal processing technology, digital information such as motion images, still images, audio can be encoded at high efficiency and recorded on small recording media or transmitted through communication media. Such a technology is applied to development of image capturing apparatuses capable of recording high quality images on recording media.

Types of recording media mainly include a tape medium such as a magnetic tape driven to travel in one direction, a disc medium such as an optical disc driven to rotate, and a memory medium such a semiconductor memory not requiring such a mechanical driving unit. Magnetic tapes had been mainly used as the recording media. However, recently, disc media or memory media are increasingly used instead of magnetic tapes. Generally, although memory media have less memory capacity than disc media, the memory media have a characteristic of excellent vibration resistance since they do not include a mechanical driving unit.

For example, for mobile image capturing apparatuses such as video camcorders, disc media are more advantageous in terms of a recordable time and an image quality. However, it is more reliable to use memory media. More specifically, users can capture images without worrying about the remaining recordable time with a video camcorder that employs a hard disc having a capacity of tens to hundreds gigabytes. However, if the video camcorder receives a strong impact, most of recorded data may be lost. On the other hand, a video camcorder employing a memory card having a capacity of tens to hundreds megabytes is used, it becomes easier to handle the video camcorder. However, it may be impossible to capture high quality images for hours.

In addition, there is a recordable optical disc for which a method called "write once" allowing recording of data in the same recording area only once is employed. Since this type of disc medium is not rewritable, a method for temporarily recording file management information on a part of the medium as intermediate data, and then recording the file management information at a proper location of the medium when a finalization operation is performed when stopping using the medium is employed for this type of disc medium. Such intermediate data not only reduces a capacity of the media but also imposes a restriction on file management, which thus undesirably decreases the convenience.

Additionally, there are image capturing apparatuses capable of utilizing a plurality of recording media at the same time. An image capturing apparatus capable of recording video data on both a magnetic tape (or an optical disc) and a memory card is described in Japanese Patent Laid-Open No. 2005-142674.

However, known image capturing apparatuses capable of utilizing a plurality of recording media require users to be always aware of the recording medium on which the target video data is recorded. Thus, it is difficult to utilize such image capturing apparatuses.

SUMMARY OF THE INVENTION

Accordingly, the present invention provides a video recording/reproducing apparatus, a video recording/reproducing method, and program allowing use of a plurality of recording media while reducing burden for users.

Furthermore, the present invention further provides a video recording/reproducing apparatus and a video recording/reproducing method allowing efficient recording/reproducing and management of video information when a plurality of recording media is used.

According to an aspect of the present invention, a video recording/reproducing apparatus is provided which includes a first recording unit configured to record video information on a first recording medium, a second recording unit configured to record video information on a second recording medium, a remaining capacity detecting unit configured to detect a remaining capacity of the first recording medium, a recording controlling unit configured to control the first and second recording units to transfer the video information having been recorded on the first recording medium to the second recording medium when a value of the remaining capacity of the first recording medium drops to a value equal to or lower than a first reference value ($\alpha$), and a reproducing unit. Regarding a reproducing operation of recorded video information instructed to be reproduced, the reproducing unit is configured to reproduce instructed video information from the second recording medium when the instructed video information is recorded on the second recording medium, whereas the producing unit is configured to reproduce the instructed video information from the first recording medium when the instructed video information is recorded on the first recording medium. Whereas, when a part of the instructed video information is recorded on the second recording medium and the rest is recorded on the first recording medium, the reproducing unit is configured to first reproduce the video information recorded on the second recording medium, and then reproduce the video information recorded on the first recording medium.

According to another aspect of the present invention, a video recording/reproducing method is provided which includes recording video information on a first recording medium, recording video information on a second recording medium, detecting a remaining capacity of the first recording medium, transferring the video information having been recorded on the first recording medium to the second recording medium when a value of the remaining capacity of the first recording medium drops to a value equal to or lower than a first reference value ($\alpha$), and, regarding a reproducing operation of recorded video information instructed to be reproduced, reproducing instructed video information from the second recording medium when the instructed video information is recorded on the second recording medium. Here, reproducing the instructed video information from the first recording medium when the instructed video information is recorded on the first recording medium. Whereas, when a part of the instructed video information is recorded on the second recording medium and the rest is recorded on the first recording medium, first reproducing the video information recorded on the second recording medium, and then reproducing the video information recorded on the first recording medium.

Further features and aspects of the present invention will become apparent from the following description of exemplary embodiments with reference to the attached drawings.

BRIEF DESCRIPTION OF THE DRAWINGS

FIGS. 3A and 3B are diagrams showing an exemplary recording state of a memory in a memory recording unit 16 and an exemplary state of a remaining capacity of the memory, respectively, whereas

DESCRIPTION OF THE EMBODIMENTS

Numerous embodiments, features, and aspects of the present invention will be described with reference to the drawings.

First Exemplary Embodiment

A first exemplary embodiment of the present invention will now herein be described.

Figure 1:
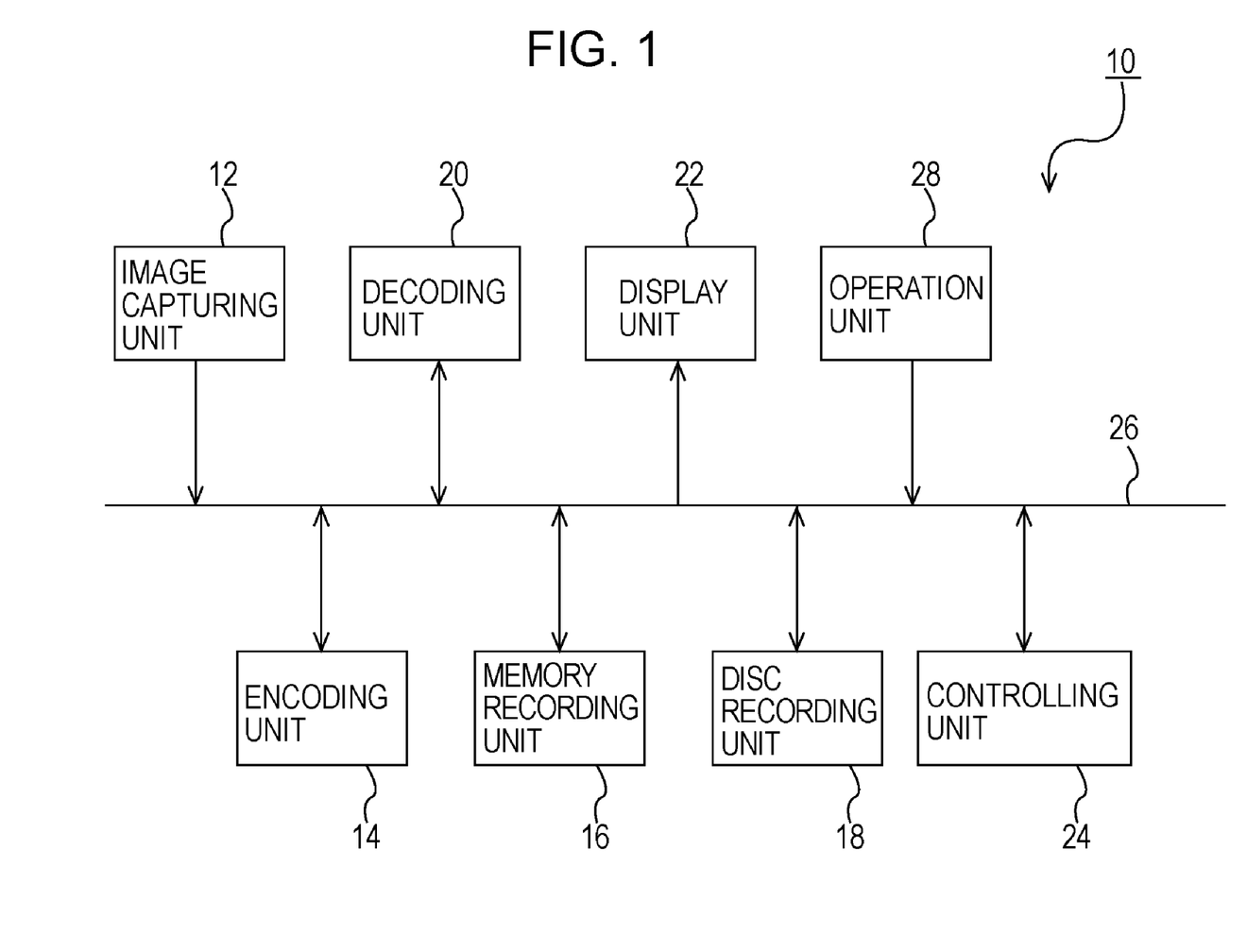
FIG. 1 is a block diagram showing an exemplary configuration of a video camcorder according to an aspect of the present invention.

FIG. 1 is a block diagram showing an exemplary configuration of a video recording/reproducing apparatus (i.e., a digital video camcorder) according to an aspect of the present invention. Referring to FIG. 1, a digital video camcorder 10 has an image capturing unit 12, an encoding unit 14, a memory recording unit 16, a disc recording unit 18, a decoding unit 20, a display unit 22, a controlling unit 24, a bus 26, and an operation unit 28.

The image capturing unit 12 includes an optical lens system, image pickup elements such as CCD (charge coupled device) sensors or CMOS (complementary metal oxide semiconductor) sensors, an autofocus mechanism, a zoom mechanism, and an A/D (analog-to-digital) converter. The image capturing unit 12 converts an optical image of a subject into electric signals, and outputs digital image signals.

The encoding unit 14 compresses and encodes the digital image signals supplied from the image capturing unit 12 according to an image compression method such as MPEG2. Furthermore, the encoding unit 14 generates an MPEG2 video stream that transports compressed image data. The encoding unit 14 can employ another image compression method, such as H.264/MPEG4 AVC (advanced video coding), Motion JPEG, or JPEG2000, instead of MPEG2.

The memory recording unit 16 has a "memory" such as an internal random access memory (RAM) or a removable flash memory card, and a module for recording/reproducing video information thereon. The disc recording unit 18 has a "disc" such as an internal hard disc or a removable optical disc, and a module for recording/reproducing video information thereon. That is, both the memory recording unit 16 and the disc recording unit 18 have recording media on which the video streams generated by the encoding unit 14 are recoded.

The decoding unit 20 decompresses and decodes the video streams recorded on the memory in the memory recording unit 16 and the disc in the disc recording unit 18 at the time of reproducing.

The display unit 22 includes a liquid crystal panel and a driving unit therefor. The display unit 22 displays images of the supplied captured image signals and reproduced image signals. In addition, the display unit 22 can handle both a character-based user interface (CUI) and a graphical user interface (GUI).

The controlling unit 24 includes a central processing unit (CPU) or a micro processing unit (MPU) (or microcomputer). The controlling unit 24 controls the digital video camcorder 10. In particular, the controlling unit 24 serves as a recording controlling unit during recording and as a reproducing controlling unit during reproducing. The bus 26, together with a direct memory access (DMA) controller (not shown), is used for transferring various data between the above-described blocks.

The operation unit 28 includes at least an image capturing switch, a recording switch, a reproducing switch, and a stop switch. The operation unit 28 is used by users to instruct the controlling unit 24 to perform an image capturing operation, a recording operation, and a reproducing operation, and to stop those operations.

Each of actions, in an image capturing mode, a recording mode, and a reproducing mode, executable by the digital video camcorder 10 will be described. The digital video camcorder 10 according to the exemplary embodiment has two selectable recording modes, i.e., a single recording mode and a parallel recording mode. In the single recording mode, video streams are directly recorded on the memory in the memory recording unit 16 or the disc in the disc recording unit 18. On the other hand, in the parallel recording mode, the video streams are recorded on the disc in the disc recording unit 18 through the memory recording unit 16.

In the image capturing mode, the image capturing unit 12 outputs digital image signals of images of a subject. The digital image signals (i.e., captured image signals) are temporarily stored in an internal memory (not shown), and images corresponding to the image signals are displayed on the display unit 22 in an order that the image signals are stored. This allows users to confirm the range and composition to be captured.

In the single recording mode, the digital image signals to be temporarily stored in the internal memory (not shown) are also transferred to the encoding unit 14. The encoding unit 14 compresses and encodes the digital image signals to generate a video stream. The video stream is recorded on one of the memory in the memory recording unit 16 and the disc in the disc recording unit 18, which is specified by users beforehand. Accordingly, a series of compressed images are stored on the memory in the memory recording unit 16 or the disc in the disc recording unit 18.

In the reproducing mode corresponding to the single recording mode, the video stream specified by users is read out from the memory in the memory recording unit 16 or the disc in the disc recording unit 18, and transferred to the decoding unit 20. The decoding unit 20 decodes the read out video stream to reconstruct the image signals. The reconstructed image signals (i.e., the reproduced image signals) are supplied to the display unit 22. This causes the reproduced images to be displayed on the screen of the display unit 22.

Figure 2:
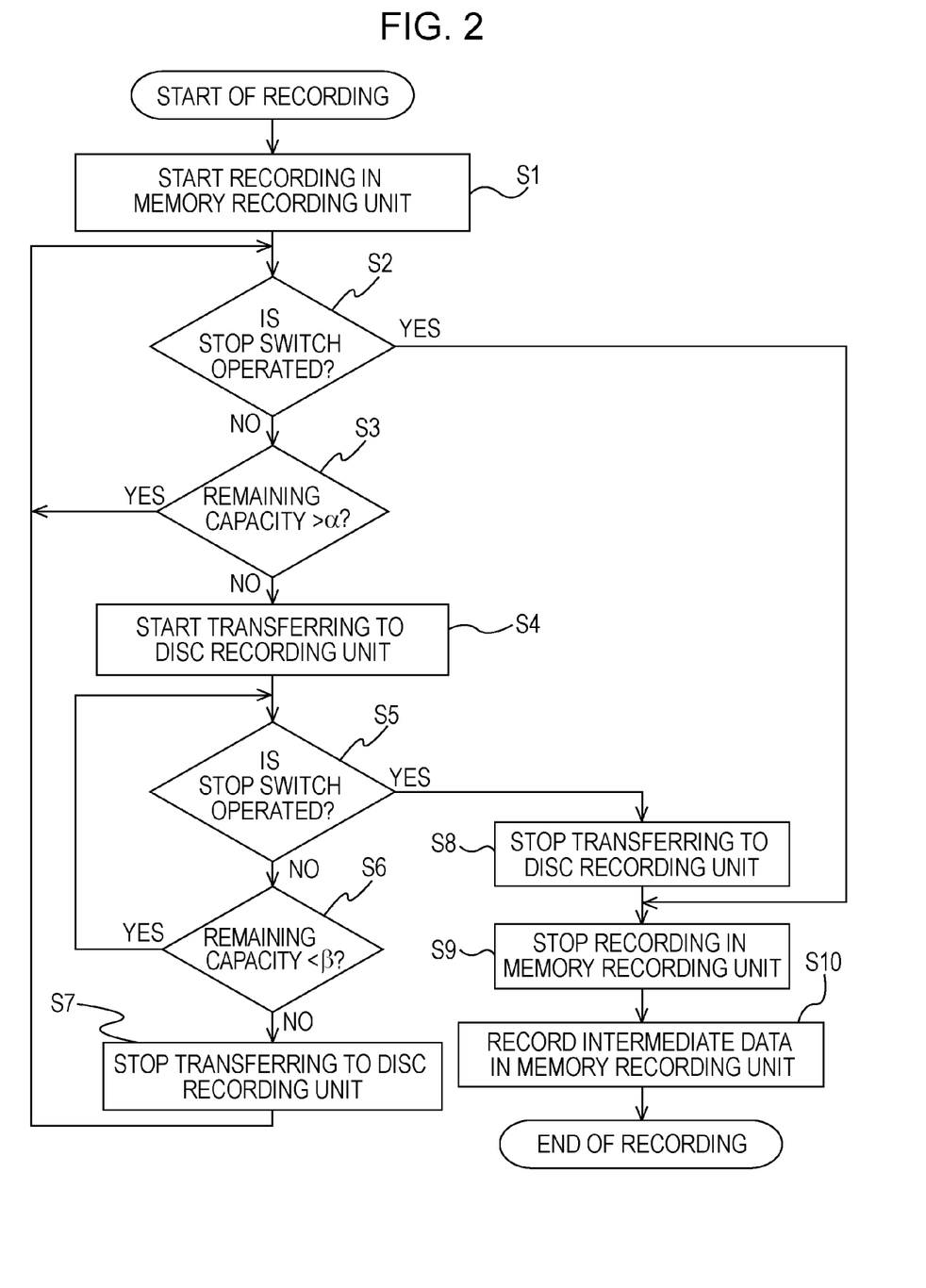
FIG. 2 is a flowchart showing an exemplary recording and transferring process according to an aspect of the present invention.
Figure 3A:
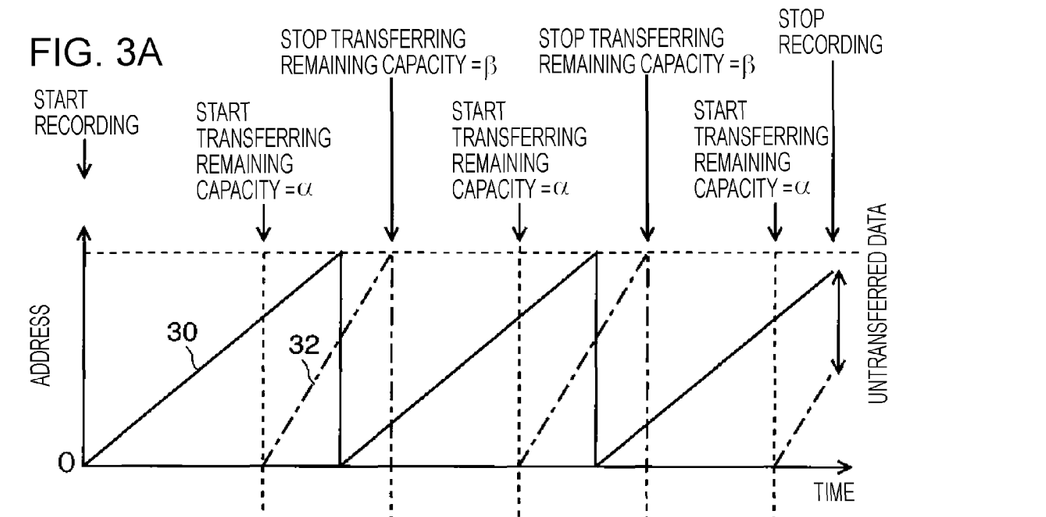
Figure 3B:
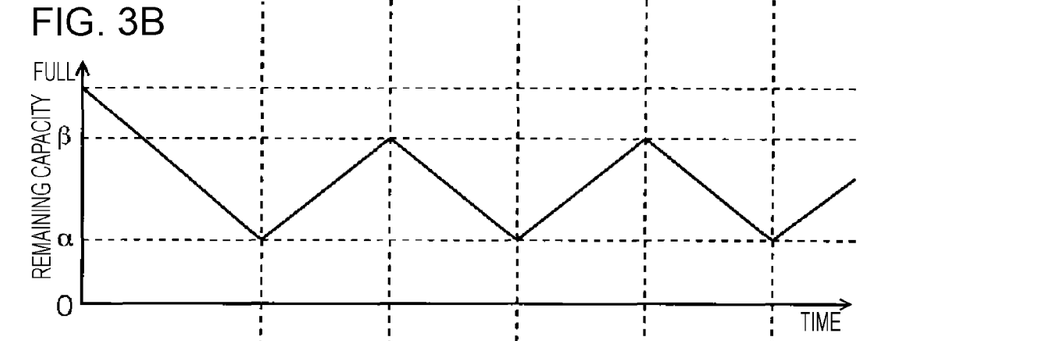
Figure 3C:
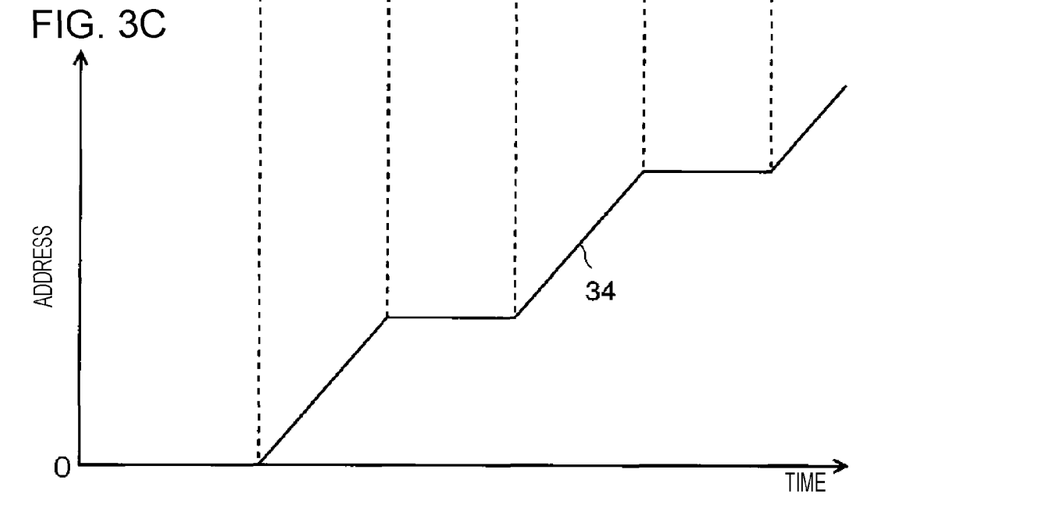
FIG. 3C is a diagram showing a temporal change in an exemplary recording state of a disc in a disc recording unit 18.

An operation performed in the parallel recording mode will be described next. FIG. 2 is a flowchart showing an exemplary recording and transferring process performed in the parallel recording mode. FIGS. 3A and 3B are diagrams showing an exemplary recording state (i.e., a change in write/read addresses) of the memory in the memory recording unit 16 and an exemplary state of a remaining capacity of the memory, respectively. FIG. 3C is a diagram showing a temporal change in an exemplary recording state (i.e., a change in a write address) of the disc in the disc recording unit 18. A solid line 30 shown in FIG. 3A indicates a write address in the memory recording unit 16, while a dot-and-dash line 32 indicates a read address. A solid line 34 shown in FIG. 3C indicates a write address in the disc recording unit 18.

The memory recording unit 16 calculates the remaining capacity of the memory included therein on the basis of a difference between the write address and the read address of the memory. For example, generally, in a case where the value of the write address is greater than that of the read address, the difference therebetween indicates the size of recorded data, and a result obtained by subtracting the size of the recorded data from a total capacity corresponds to the remaining capacity. Conversely, in a case where the value of the write address is equal to or smaller than that of the read address, the difference therebetween corresponds to the remaining capacity. Here, it is assumed that a writing speed of the memory recording unit 16 is slower than a reading speed of the memory recording unit 16.

Now referring to FIG. 2, if a user operates the recording switch in the image capturing mode, the recording operation starts. More specifically, the memory recording unit 16 starts recoding the video stream generated by the encoding unit 14 on the memory included therein (STEP S1).

Whether or not the user has operated the stop switch (or a pause switch) is determined (STEP S2). If the stop switch is operated (YES in STEP S2), the process proceeds to STEP S9 (discussed later). If the stop switch is not operated (NO in STEP S2), the memory recording unit 16 determines whether or not the value of the remaining capacity of the memory in the memory recording unit 16 has dropped to a predetermined value α (STEP S3). The remaining capacity of the memory decreases as the memory recording unit 16 continues to record the video stream. If the value of the remaining capacity is greater than the predetermined value α (YES in STEP S3), the memory recording unit 16 continues to record the video stream on the memory included therein. Then the process returns to STEP S2.

If the value of remaining capacity drops to a value equal to or lower than the predetermined value α (NO in STEP S3), transferring of the video stream, having been recorded on the memory by the memory recording unit 16, to the disc recording unit 18 is started (STEP S4). The disc recording unit 18 records the transferred video stream on the disc included therein.

After the transferring of the video stream from the memory recording unit 16 to the disc recording unit 18 has been started, the controlling unit 24 determines whether or not the user has operated the stop switch (or the pause switch) (STEP S5). If the stop switch is not operated by the user (NO in STEP S5), the video stream is continuously recorded on the memory in the memory recording unit 16. More specifically, at this time, the recording of the video stream on the memory in the memory recording unit 16 and the reproducing of the video stream from the memory in the memory recording unit 16 to transfer the video stream to the disc recording unit 18 are being performed at the same time. Following stream data can be recorded in a memory space of the memory in the memory recording unit 16 that is no longer used due to the reproducing of the video stream. If the video stream is written in the last address of the memory in the memory recording unit 16, the write address is set back to the first address and the writing of the stream is continuously performed.

Thus, if the stop switch is not operated (NO in STEP S5), the memory recording unit 16 determines whether or not the value of the remaining capacity of the memory included therein has reached to a predetermined value β(>α) (STEP S6). By transferring the video stream from the memory recording unit 16 to the disc recording unit 18, the remaining capacity of the memory increases. If the value of the remaining capacity is smaller than the predetermined value β (YES in STEP S6), the process returns to STEP S5. On the other hand, if the value of the remaining capacity increases to a value equal to or greater than the predetermined value β (NO in STEP S6), the transferring of the video stream from the memory recording unit 16 to the disc recording unit 18 is stopped (STEP S7), and the process returns to STEP S2.

On the other hand, if the user operates the stop switch after the transferring of the video stream from the memory recording unit 16 to the disc recording unit 18 has been started (YES in STEP S5), the transferring of the video stream from the memory recording unit 16 to the disc recording unit 18 is stopped (STEP S8), and the memory recording unit 16 stops recording the video stream (STEP S9).

At the time that the user operates the stop switch, untransferred video stream exists in a memory area between the write address and the read address in the memory included in the memory recording unit 16. The untransferred video stream is transferred to the disc recording unit 18 when a finalization operation according to the exemplary embodiment is performed, which is described in detail below.

The intermediate data is recorded on the memory in the memory recording unit 16 to manage the untransferred video stream (STEP S10), and the recording operation is terminated.

FIGS. 3A to 3C show temporal changes in states of the memory and the disc regarding the above-described recording operation. The intermediate data is information used for managing locations of the recorded video stream and the content of the recorded video stream, and corresponds to management information in various file systems and a video information file. The intermediate data is utilized in the finalization operation performed by the disc recording unit 18.

Figure 4:
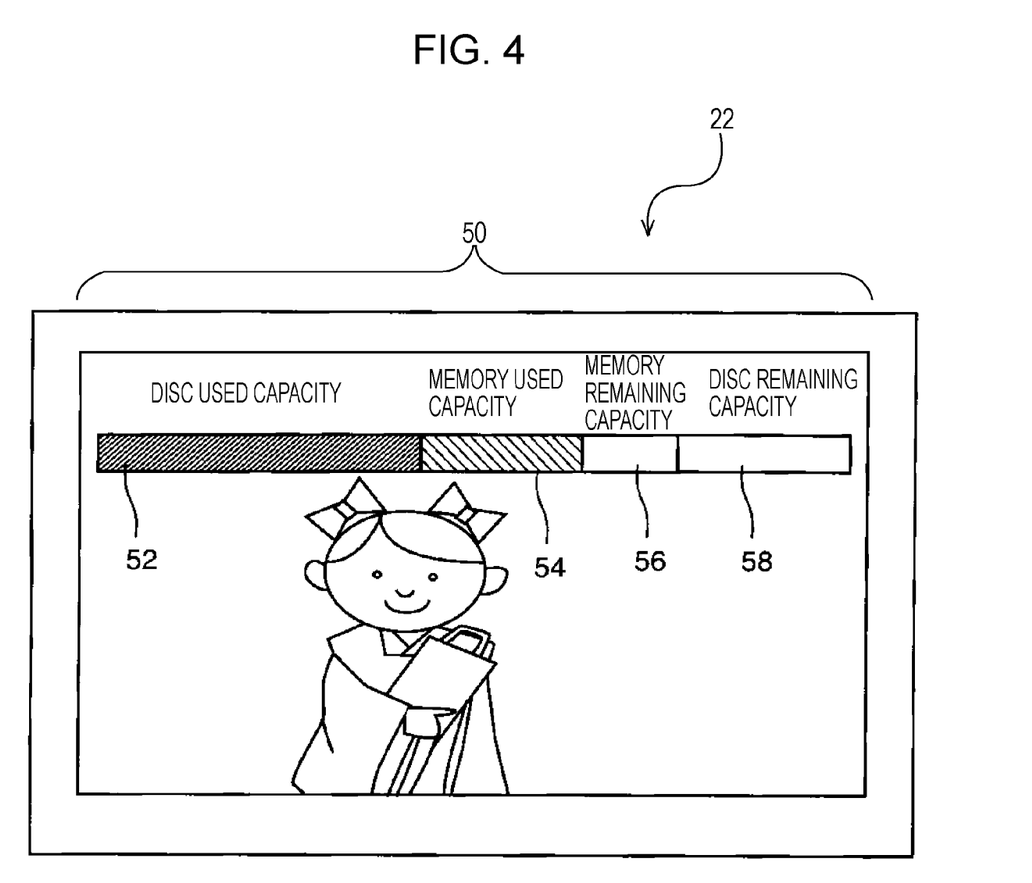
FIG. 4 is a display example of a recorded image.

Referring to FIG. 4, an exemplary display screen displayed on the display unit 22 in the recording mode will be described. FIG. 4 is a display example of a recorded image. The recorded image shown in FIG. 4 includes an image based on the captured image signals and a graphic superimposed thereon. The recorded image shown in FIG. 4 includes a status bar 50 as a graphic. The status bar 50 further includes bars 52, 54, 56, and 58, which are variable display components. The bar 52 shows a used capacity of the disc included in the disc recording unit 18, while the bar 54 shows a used capacity of the memory included in the memory recording unit 16. In addition, the bar 56 shows a remaining capacity of the memory included in the memory recording unit 16, while the bar 58 shows a remaining capacity of the disc included in the disc recording unit 18. The sum of the bar 54 and the bar 56 shows a total capacity of the memory included in the memory recording unit 16. The sum of the bar 52 and the bar 58 shows a total capacity of the disc included in the disc recording unit 18. The sum of the bar 56 and the bar 58 shows a total remaining capacity of the memory included in the memory recording unit 16 and the disc included in the disc recording unit 18. The sum of the bar 54 and the bar 52 shows a total used capacity of the memory included in the memory recording unit 16 and the disc included in the disc recording unit 18.

At STEP S1 shown in FIG. 2, since the video stream is continuously recorded on the memory in the memory recording unit 16, the bar 54 elongates, while the bar 56 shortens. In addition, since the transferring of the video stream is started if the value of the remaining capacity drops to the predetermined value α at STEP S3, the bars 54 and 58 shorten, while the bars 52 and 56 elongate. Furthermore, since the transferring of the video stream is stopped if the value of the remaining capacity of the memory included in the memory recording unit 16 reaches the predetermined value β at STEP S6, the bar 54 elongates, while the bar 56 shortens.

Figure 5:
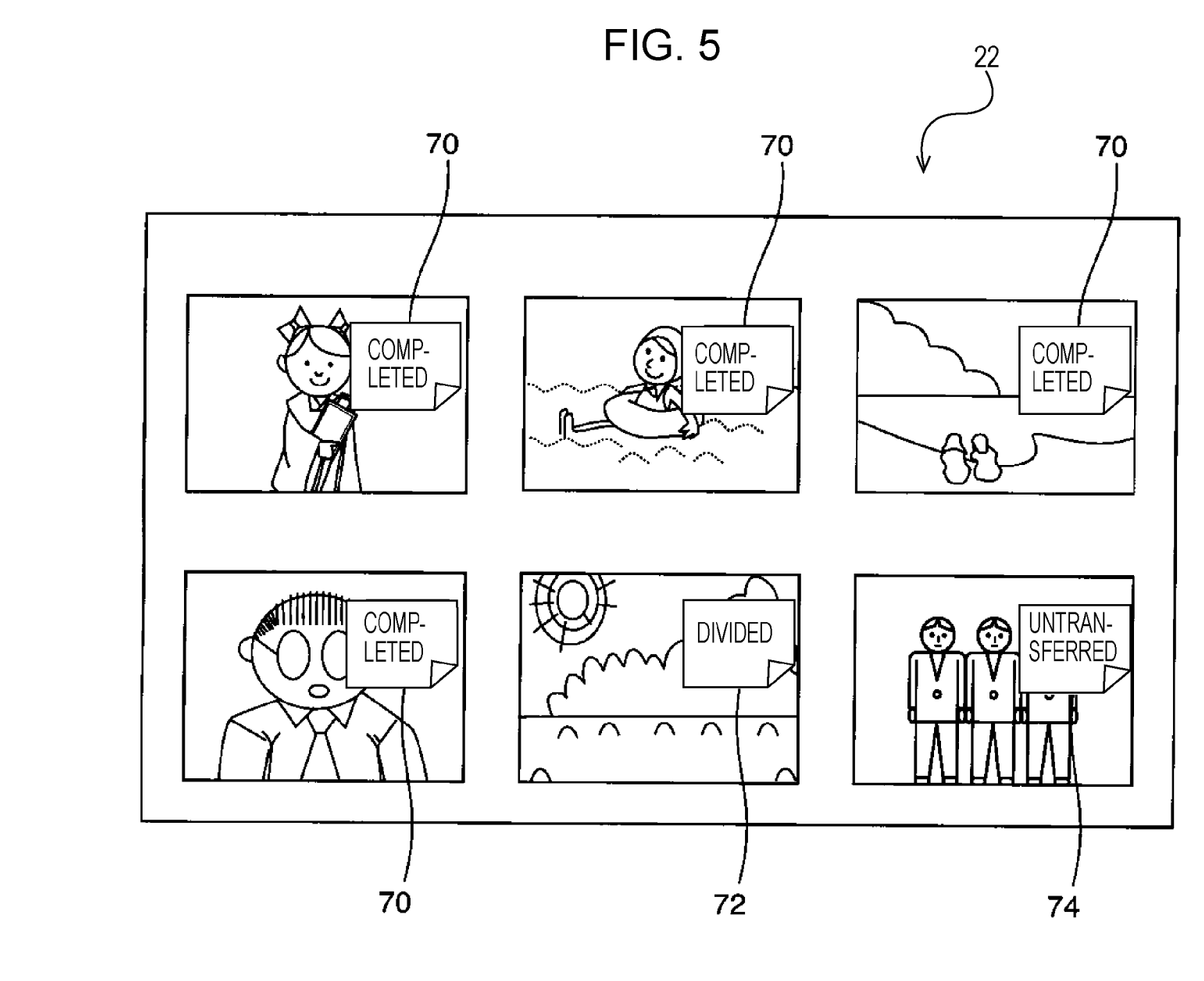
FIG. 5 is a display example at the time of reproducing.

FIG. 5 is an exemplary screen displayed on the display unit 22 in a reproducing mode corresponding to the parallel recording mode. As shown in FIG. 5, in the reproducing mode, a list of thumbnail images each representing the recorded motion image data is displayed on the display unit 22. In addition, a graphic clip 70, 72, or 74 is attached to each thumbnail image. Each clip is generated on the basis of the information used for managing the recorded video stream. The "completed" clip 70 indicates that the video stream of motion images has been transferred from the memory recording unit 16 to the disc recording unit 18 (i.e., the video stream is stored on the disc of the disc recording unit 18). The "divided" clip 72 indicates that the video stream of the motion images is currently being transferred from the memory recording unit 16 to the disc recording unit 18. That is, the "divided" clip 72 indicates a state in which a part of the video stream exists on the disc of the disc recording unit 18 and the rest remains on the memory of the memory recording unit 16 as an untransferred video stream. The "untransferred" clip 74 indicates that the video stream of motion images is not transferred from the memory recording unit 16 to the disc recording unit 18 (i.e., the video stream is stored on the memory of the memory recording unit 16 as an untransferred video stream).

When the user instructs reproducing of the motion images to which the clip 70 is attached, the selected video stream is read out from the disc in the disc recording unit 18. The decoding unit 20 decodes the read out video stream to reconstruct the image signals. The reconstructed image signals (the reproduced image signals) are supplied to the display unit 22, whereby the reproduced images are displayed on a screen of the display unit 22.

When the user instructs reproducing of the motion images to which the clip 72 is attached, a first part of the video stream of the selected motion images exists in the disc of the disc recording unit 18 and a latter part exists in the memory of the memory recording unit 16. Accordingly, the first part of the selected video stream is first read out from the disc of the disc recording unit 18, and decoded by the decoding unit 20. The reproduced images of the first part are then displayed on the screen of the display unit 22. After the end of reproducing the video stream recorded on the disc of the disc recording unit 18, the latter part of the selected video stream is read out from the memory of the memory recording unit 16, and decoded by the decoding unit 20. The reproduced images of the latter part are then displayed on the screen of the display unit 22.

When the user instructs reproducing of the motion images to which the clip 74 is attached, the selected video stream is read out from the memory in the memory recording unit 16. The decoding unit 20 decodes the read out video stream to reconstruct the image signals. The reconstructed image signals (the reproduced image signals) are supplied to the display unit 22, whereby the reproduced images are displayed on the screen of the display unit 22.

Figure 6:
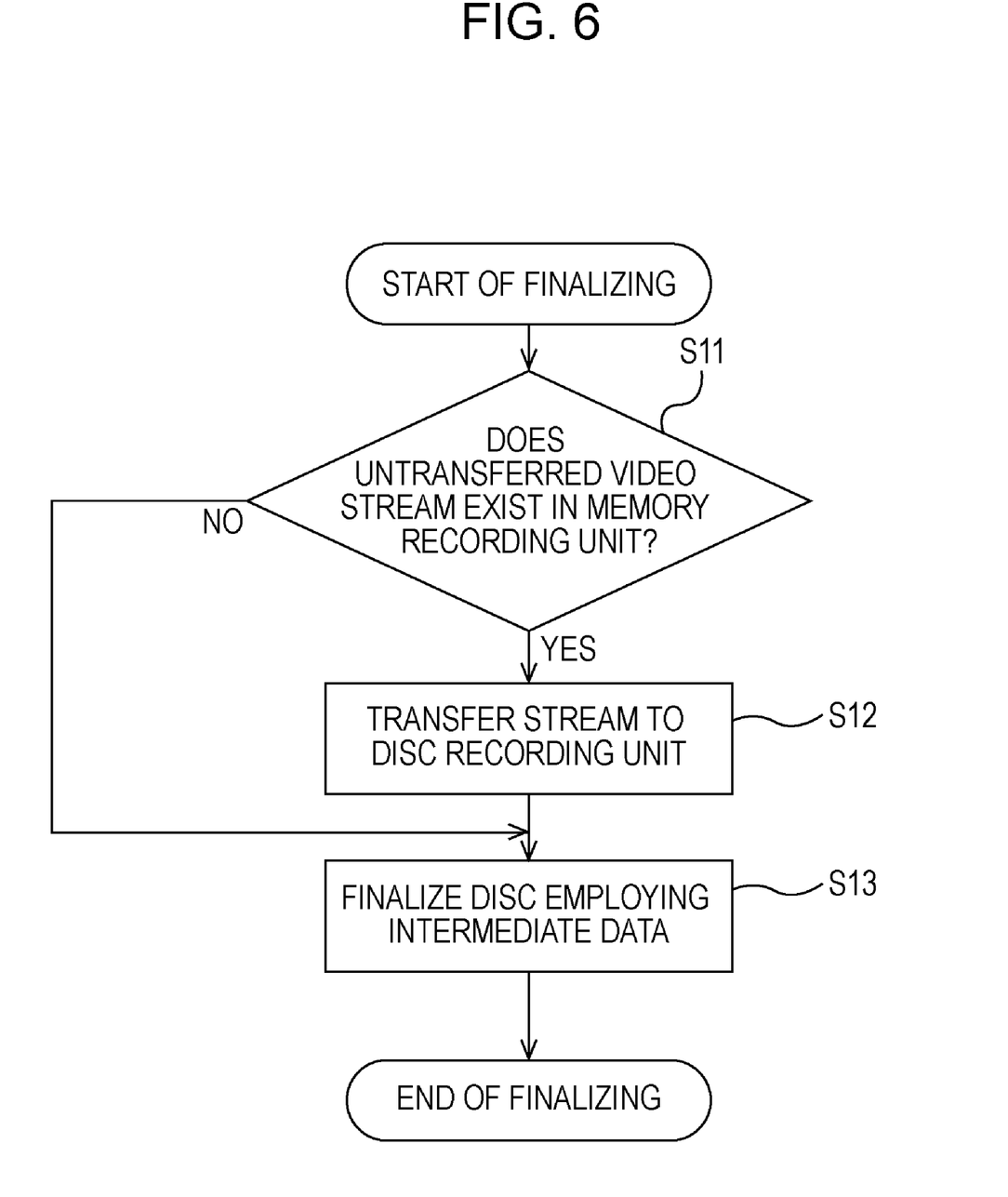
FIG. 6 is a flowchart showing an exemplary finalization process according to an aspect of the present invention.

FIG. 6 is a flowchart showing a finalization operation. Upon starting the finalization operation in response to a user's instruction given in a mode such as the reproducing mode, whether or not the untransferred video stream remains in the memory of the memory recording unit 16 is checked (STEP S11). If the untransferred video stream exists (YES in STEP S11), the video stream is transferred to the disc recording unit 18 (STEP S12). The disc recording unit 18 finalizes the disc included therein using the intermediate data held in the memory recording unit 16 (STEP S13). On the other hand, if the untransferred video stream does not exist (NO in STEP S11), the disc recording unit 18 immediately finalizes the disc included therein using the intermediate data (STEP S13). In the finalization operation in the exemplary embodiment corresponds to an operation to gather the recorded motion images on the disc in the disc recording unit 18 and to bring the disc into the completed state.

For example, suppose that the memory recording unit 16 is constituted by a recording medium having a small capacity (e.g., a recordable time of about 30 minutes), an extremely small risk of data corruption, and a high responsiveness, while the disc recording unit 18 is constituted by a hard disc having a large capacity (e.g., a recordable time of about 10 hours). In such a case, video data is recorded on the disc in the disc recording unit 18 through the memory recording unit 16, and the video data remaining in the memory recording unit 16 is transferred to the disc recording unit 18 in the stage of finalization of the disc. This enables recording of high quality images for hours while sufficiently suppressing the risk of damaging the medium in handling.

In addition, in the case where the memory included in the memory recording unit 16 and/or the disc included in the disc recording unit 18 are removable, the digital video camcorder 10 may warn users that the finalization operation is necessary when the users instructs the removal of the memory and/or the disc. If the untransferred data exists in the memory recording unit 16, the digital video camcorder 10 may warn the users that there is the untransferred data. The warnings may be displayed on the screen of the display unit 22 as special graphics. At this time, a warning beep may be emitted from a speaker (not shown).

In the above-described exemplary embodiment, an example in which the disc recording unit 18 includes a hard disc has been explained. However, it is obvious that media requiring the finalization operation, for example, DVD-R, which is a non-rewritable optical disc, can be used instead. In addition, since the DVD-R is removable, the above-described warnings and warning beep may be output when the DVD-R is removed.

Figure 7:
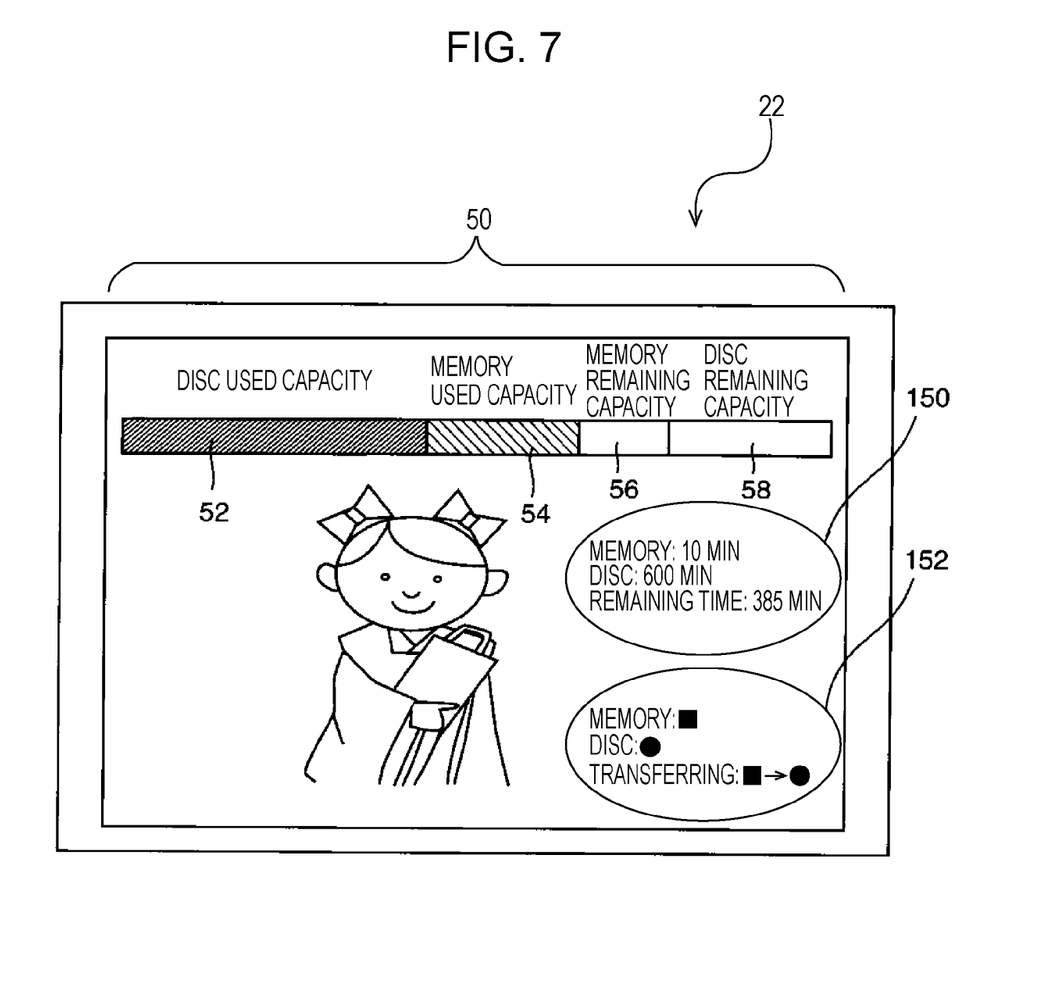
FIG. 7 is another display example of a recorded image.

Additionally, in the display example shown in FIG. 4, only the status bar 50 is displayed. However, to allow users to have a quantitative understanding, a graphic 150 showing a remaining recordable time based on the remaining capacity and a graphic 152 expressing a state of transferring may be displayed in addition to or instead of the status bar 50, as shown in FIG. 7.

Furthermore, a total remaining capacity may be separately displayed instead of or in addition to the status bar 50.

Other Exemplary Embodiments

Each of the above-described units constituting a video recording/reproducing apparatus and each of the steps of a video recording/reproducing method according to the above-described exemplary embodiment of the present invention can be realized by running a program stored in a RAM or a ROM of a computer. The program and a computer-readable recording medium having the program recorded thereon are also included in the present invention.

In addition, the present invention can be embodied as, for example, a system, an apparatus, a method, a program, or a storage medium. More specifically, the present invention may be employed in a system constituted by a plurality of apparatuses or in an apparatus having a device.

In the present invention, software programs (programs corresponding to the flowcharts shown in FIGS. 2 and 6 in the exemplary embodiment) that realize functions of the before-mentioned exemplary embodiment may be directly supplied to a system or an apparatus. Alternatively, the functions can be achieved by remotely supplying the programs to the system or the apparatus, and by reading out and executing the supplied program codes by a computer included in the system or the apparatus.

Thus, the program codes installed in the computer to realize the functions of the present invention also embody the present invention. That is, the computer program that realizes the functions of the present invention is also included in the present invention.

In such a case, the program may in any form, such as, an object code, a program executed by an interpreter, or script data supplied to an operating system, as long as it can realize the functions.

Types of recording media used for supplying the program include, for example, a floppy Disc®, a hard disc, an optical disc such as a CD-ROM, a CD-R, a CD-RW, and a DVD (DVD-ROM or DVD-R), a magneto-optical disc such as an MO, a magnetic tape, a nonvolatile memory card, and a ROM.

Regarding methods for supplying the program, a client computer may access a web site on the Internet using a browser to download the computer program according to an aspect of the present invention from the web site, whereby the program can be supplied. Alternatively, a compressed file having an automatic installation function may be downloaded to a recording medium such as a hard disc, whereby the program can be supplied.

In addition, program codes constituting the program according to an aspect of the present invention may be divided into a plurality of files, and each of the plurality of files may be downloaded form different web sites, whereby functions of the present invention can be realized. That is, a World Wide Web server that allows a plurality of users to download the program files for realizing the functions of the present invention is also included in the present invention.

Additionally, the program according to an aspect of the present invention may be encrypted and stored on a storage medium such as a CD-ROM, and distributed to users, and only users that satisfy a predetermined condition are allowed to download decryption key information of a decryption key from a web site via the Internet. The encrypted program is executed using the key information and installed in a computer, whereby functions of the present invention can be realized.

Furthermore, the computer executes the read out program, thereby realizing functions of the above-described exemplary embodiment. In addition, an operating system or the like working on the computer may perform some or all of the actual processing operations on the basis of instructions of the program, and the functions of the above-described exemplary embodiment may be realized by the processing operations.

Moreover, the program read out from the recording medium may be written in a memory included in a function expansion board inserted into the computer or a memory included in a function expansion unit connected to the computer. Then, on the basis of instructions of the program, a CPU or the like included in the function expansion board or the function expansion unit executes some or all of the processing operations, and the functions of the above-described exemplary embodiment may be realized by the processing operations.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-114801 filed Apr. 18, 2006, which is hereby incorporated by reference herein in its entirety.

What is claimed:

1. A video recording/reproducing apparatus comprising:
    a first recording unit configured to record video information on a first recording medium;
    a second recording unit configured to record video information on a second recording medium;
    a remaining capacity detecting unit configured to detect a remaining capacity of the first recording medium;
    a recording controlling unit configured to control the first and second recording units to transfer the video information having been recorded on the first recording medium to the second recording medium when a value of the remaining capacity of the first recording medium drops to a value equal to or lower than a first reference value ($\alpha$); and
    a reproducing unit, regarding a reproducing operation of recorded video information instructed to be reproduced, being configured to reproduce instructed video information from the second recording medium when the instructed video information is recorded on the second recording medium,
    whereas the reproducing unit is configured to reproduce the instructed video information from the first recording medium when the instructed video information is recorded on the first recording medium, and
    whereas, when a part of the instructed video information is recorded on the second recording medium and the rest is recorded on the first recording medium, the reproducing unit is configured to first reproduce the video information recorded on the second recording medium, and then reproduce the video information recorded on the first recording medium.

2. The apparatus according to claim 1, wherein, if the value of the remaining capacity of the first recording medium reaches a second reference value ($\beta$) that is greater than the first reference value ($\alpha$) during the transfer of the video information from the first recording medium to the second recording medium, the recording controlling unit stops the transferring of the video information from the first recording medium to the second recording medium.

3. The apparatus according to claim 1, wherein the first recording unit continues recording the video information on the first recording medium during the transfer of the video information from the first recording medium to the second recording medium.

4. The apparatus according to claim 1, wherein the recording controlling unit stops transferring the video information from the first recording medium to the second recording medium when the recording of the video information on the first recording medium is stopped during the transfer of the video information from the first recording medium to the second recording medium.

5. The apparatus according to claim 1, further comprising a warning unit configured to warn users of video information remaining on the first recording medium when at least one of the first and second recording media is removed.

6. The apparatus according to claim 1,
    wherein the second recording unit is configured to perform a finalization operation on the second recording medium to execute the finalization operation, and wherein the second recording unit checks whether or not untransferred video information exists on the first recording medium, and transfers the untransferred video information to the second recording medium when the untransferred video information exists.

7. The apparatus according to claim 6, wherein the first recording unit stores intermediate data necessary for the finalization operation on the first recording medium, and supplies the intermediate data to the second recording unit when the second recording unit performs the finalization operation.

8. The apparatus according to claim 1, further comprising:
an image capturing unit configured to generate the video information; and
an encoding unit configured to encode the video information generated by the image capturing unit, wherein, after being encoded by the encoding unit, the video information generated by the image capturing unit is recorded on the first recording medium by the first recording unit.

9. The apparatus according to claim 1, further comprising a display unit configured to display a graphic showing that the video information is recorded on the second recording medium, is recorded on the first recording medium, and is separately recorded on the first and second recording media.

10. The apparatus according to claim 1, further comprising a display unit configured to display a graphic showing a used capacity and the remaining capacity of the first recording medium and a used capacity and the remaining capacity of the second recording medium in an integrated fashion.

11. The apparatus according to claim 1, wherein the first recording medium is a memory medium, and whereas, the second recording medium is a disc medium.

12. The apparatus according to claim 11, wherein the second recording medium is a hard disc medium.

13. The apparatus according to claim 11, wherein the second recording medium is an optical disc medium.

14. A video recording/reproducing method comprising:
recording video information on a first recording medium;
recording video information on a second recording medium;
detecting a remaining capacity of the first recording medium;
transferring the video information having been recorded on the first recording medium to the second recording medium when a value of the remaining capacity of the first recording medium drops to a value equal to or lower than a first reference value ($\alpha$); and
regarding a reproducing operation of recoded video information instructed to be reproduced, reproducing instructed video information from the second recording medium when the instructed video information is recorded on the second recording medium,
whereas reproducing the instructed video information from the first recording medium when the instructed video information is recorded on the first recording medium, and
whereas, when a part of the instructed video information is recorded on the second recording medium and the rest is recorded on the first recording medium, first reproducing the video information recorded on the second recording medium, and then reproducing the video information recorded on the first recording medium.

15. A non-transitory computer readable medium containing computer-executable instructions for performing recording/reproducing operations to be executed in a video recording/reproducing apparatus, the medium comprising:
computer-executable instructions for recording video information on a first recording medium;
computer-executable instructions for recording video information on a second recording medium;
computer-executable instructions for detecting a remaining capacity of the first recording medium;
computer-executable instructions for transferring the video information having been recorded on the first recording medium to the second recording medium when a value of the remaining capacity of the first recording medium drops to a value equal to or lower than a first reference value ($\alpha$); and
regarding a reproducing operation of recoded video information instructed to be reproduced, computer-executable instructions for reproducing instructed video information from the second recording medium when the instructed video information is recorded on the second recording medium,
whereas reproducing the instructed video information from the first recording medium when the instructed video information is recorded on the first recording medium, and
whereas, when a part of the instructed video information is recorded on the second recording medium and the rest is recorded on the first recording medium, first reproducing the video information recorded on the second recording medium, and then reproducing the video information recorded on the first recording medium.

* * * * *